United States Patent

[11] 3,566,900

| | | |
|---|---|---|
| [72] | Inventor | Jay I. Black<br>Orange, Conn. |
| [21] | Appl. No. | 803,758 |
| [22] | Filed | Mar. 3, 1969 |
| [45] | Patented | Mar. 2, 1971 |
| [73] | Assignee | Avco Corporation<br>Stratford, Conn. |

[54] FUEL CONTROL SYSTEM AND VISCOSITY SENSOR USED THEREWITH
6 Claims, 1 Drawing Fig.

[52] U.S. Cl............................................. 137/83,
137/81.5, 60/243, 60/39.28
[51] Int. Cl............................................. F15c 1/04
[50] Field of Search........................................... 137/81.5,
83; 73/55, 205 (L), 357; 60/243, 39.28

[56] References Cited
UNITED STATES PATENTS

| 3,314,294 | 4/1967 | Colston............... | 137/81.5X |
| 3,403,842 | 10/1968 | Roche.................. | 137/81.5X |
| 3,488,948 | 1/1970 | Cornett et al........... | 137/81.5X |

*Primary Examiner*—William R. Cline
*Attorneys*—Charles M. Hogan and Gary M. Gron

ABSTRACT: The disclosure illustrates a fuel viscosity sensor incorporated in a fuel control system for a gas turbine engine to assure a constant engine power output irrespective of fuel viscosity changes. The viscosity sensor comprises a proportional fluidic amplifier having a laminar flow element, series connected with one control jet. The fluidic amplifier is connected to the pressurized fuel supply and its output is proportional to the fuel viscosity. The pressure output from this amplifier is used to correct a flow-metering device for viscosity changes.

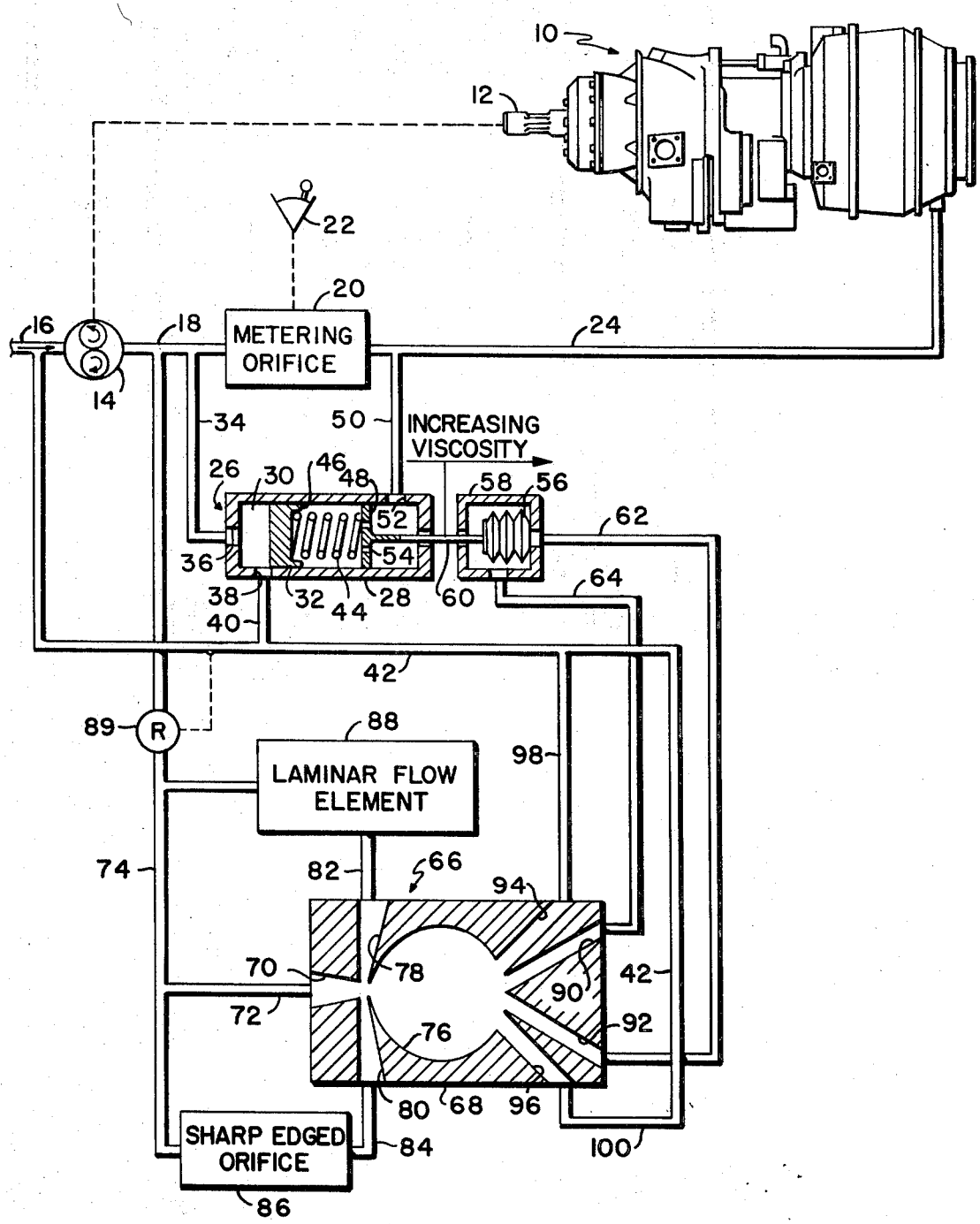

FUEL CONTROL SYSTEM AND VISCOSITY SENSOR USED THEREWITH

The present invention relates to viscosity sensing devices and more specifically to flow control systems used in combination with this type of device.

In recent years there have been significant design improvements that enable gas turbine fuel control systems to maintain the selected power output of an engine at a level practically independent of uncontrolled parameters. One parameter that has not yet been effectively compensated for is the variation in the energy content of the fuel used by the engine. A variation in this parameter has an immediate and substantial effect on the power output of the engine. It has been found that this characteristic of the fuel is a direct function of the fuel viscosity, which is affected by the fuel type and fuel temperature.

While many present-day fuel controls provide a manual adjustment for fuel type, practically none automatically compensate for fuel type and fuel temperature. The net result is that an engine will have a different power output for different fuel types and fuel temperatures. There have been a few attempts to automatically compensate for fuel temperature but temperature accounts for only about 50 percent of the metered fuel flow error.

Therefore, it is an object of the present invention to provide a fuel control system for an engine of the above general type which efficiently, economically and effectively compensates for changes of fuel viscosity to provide a uniform controlled power output.

It is a further and more specific object of the present invention to provide a simplified and effective viscosity sensor for use with the above system or other types of liquid flow systems.

The objects of the invention are achieved in one aspect by providing a fluidic viscosity-sensing device comprising a power stream discharge means adapted to be connected to a supply of the pressurized fuel or liquid whose viscosity is to be measured. A means, also connected to the pressurized liquid, is provided for discharging at least one control jet against the discharge means power stream. The control jet deflects the power stream proportional to the flow of the control jet. A means is provided to receive the power stream and provide a pressure output proportional to the deflection of the power stream. A flow element means, such as a laminar flow element, is series connected between the control jet and the pressurized fuel to vary the flow to the control jet discharge means responsive to the changes in viscosity of the fuel. As a result, the pressure output of the fluidic device is proportional to the viscosity of the liquid. 3

In another aspect of the present invention, other objects outlined above are achieved by providing the fluidic viscosity sensor in a fuel control system and connecting the fuel supply to the fluidic device so that the fuel metered to an engine is varied as a function of the fuel viscosity to compensate for the effects of viscosity on the fuel energy content.

The above and other related objects and features of the present invention will be apparent from a reading of the following description of the disclosure found in the accompanying drawing and the novelty thereof pointed out in the appended claims.

The single FIGURE of the drawing is a diagrammatic illustration of a viscosity sensor embodying the present invention, along with a gas turbine engine and fuel control system in which the invention may be used.

Referring now to the drawing, there is shown a gas turbine engine 10 of the turboshaft type that may be used in propeller-driven aircraft, rotary-wing aircraft, or marine vehicles. The details of such an engine are well known to those skilled in the art so that it is not necessary for a clear understanding of the present invention to explain the components and functions of the engine in detail.

It is sufficient for the present purposes to say that the engine has a series of fuel nozzles for injecting a metered amount of fuel into a combustion chamber where the fuel is mixed with pressurized air and ignited to provide a propulsive gas stream. This stream is discharged to drive, among other things, a power turbine (not shown) that drives a power output shaft 12.

The fuel nozzles of the engine 10 receive a supply of fuel from a fuel control system comprising an engine-driven main fuel pump 14, receiving a suitable supply of fuel from an inlet conduit 16 and pressurizing it for delivery through conduit 18 to a metering orifice 20. The metering orifice 20 has a variable area primarily determined by an operator-controlled power lever 22 to vary the flow through the metering orifice to a nozzle supply conduit 24, extending to the engine nozzles. The power lever 22 input to the fuel metering orifice 20 is modified by a number of engine operating parameters to provide proper transient and steady state operating conditions for the engine 10. These inputs are apparent to those skilled in the art and need not be outlined in this discussion of the present invention.

A pressure-regulating device 26 is provided to maintain a constant pressure differential across the orifice 20 in order to have the flow through the orifice 20 a direct function of its area. The pressure-regulating device 26 comprises a housing 28, having an internal chamber 30, in which a piston valve element 32 is displaceable. A conduit 34 is connected to conduit 18 and extends to a port 36 at one end of chamber 30 to expose the outer face of valve element 32 to fuel pressure upstream of orifice 20. An outlet port 38, at the same end of chamber 30, connects with a discharge conduit 40 that extends to a main low-pressure discharge conduit 42, thereby providing a bypass flow path upstream of metering orifice 20.

The valve element 32 is urged toward a position restricting the bypass flow through port 39 by a spring 44 acting on a recess 46 of valve element 32 and a flanged plate 48 positioned in the opposite end of chamber 30. The opposite end of chamber 30 is connected to the nozzle supply conduit 24 downstream of metering orifice 20 by a conduit 50 and a port 52. A series of ports 54 in plate 48 enable the metering orifice downstream pressure to be applied to the inner face of valve element 32.

The valve element 32 is displaced to vary the bypass flow upstream of the metering orifice 20 until the pressure in conduit 18 is a predetermined pressure above the level in conduit 24. This pressure differential is automatically maintained at the level of force with which the spring 44 acts against the valve element 32.

As stated previously, it is necessary to compensate the flow of the fuel to the engine 10 to maintain a given power output, irrespective of fuel viscosity changes. For this purpose, the force with which the spring 44 acts against the valve element 32 is varied by a bellows 56 housed in a chamber 58 and having an output shaft 60 connected to the plate 48. The bellows 56 expands and contracts in response to liquid pressure signals from a pair of output pressure conduits 62 and 64 of a fluidic viscosity sensor 66 embodying the present invention.

The viscosity sensor 66 comprises a housing 68 having a power stream nozzle 70 supplied with fuel or other liquid from a supply conduit 72. The supply conduit 72 is connected to a main viscosity sensor supply conduit 74 extending to pump discharge conduit 18. The nozzle 70 discharges a power stream into a chamber 76. The power stream, thus discharged, is deflected in response to the resultant flow of control jets discharged from a pair of oppositely positioned control ports 78 and 80. The ports 78, 80 are respectively supplied with pressurized fuel or other liquid from conduits 82, 84 extending to the main supply conduit 74. The flow from port 80 is controlled by a sharp-edged orifice 86, series connected with the port 80. As described later, the sharp-edged orifice 86 may have an adjustable variable area. The flow from port 78 is controlled by a laminar flow element 88, series connected between port 78 and the main supply conduit 74. A suitable regulator 89 is positioned upstream of conduit 74 to maintain a constant pressure above the pressure in return conduit 42 thereby maintaining a constant pressure across the sensor.

The power stream, discharged from nozzle 70, impinges on a pair of receiver ports 90, 92 respectively connected to the conduits 64 and 62. The receiver ports 90, 92 are positioned so that when the power stream from nozzle 70 is undeflected, equal pressures are experienced in the ports. When the stream is deflected by varying flows from the control ports 78, 80, the pressure in one of the receiver ports will be higher than in the other. A pair of drain ports 94, 96 are respectively positioned adjacent the receiver ports 90, 92. These ports connect with discharge conduits 98, 100 extending to the main low-pressure discharge conduit 42.

The viscosity sensor 66 operates in the following manner. When fuel pump 14 pressurizes fuel, the viscosity sensor supply conduit 74 provides a flow path for fuel to power stream nozzle 70, thereby causing a power stream to be discharged into chamber 76. At the same time, fuel is caused to flow through the laminar flow element 88 and the sharp-edged orifice 86 to the control ports 78, 80. The regulator 89 maintains a constant pressure differential across the viscosity sensor 66 and the fuel will flow through the laminar element as a direct function of density and as an inverse function of the fuel viscosity. For the sharp-edged orifice, the flow therethrough is a direct function of density. Accordingly, the relative flow through the elements and from the control ports 78, 80 is an inverse function of fuel viscosity times a constant which reflects the sizes of the flow elements. Therefore, as fuel viscosity increases, the flow through the laminar flow element 88 is decreased relative to orifice 86. As a result, the power stream is deflected toward receiver port 90, thereby increasing the pressure on conduit 64 relative to the pressure on conduit 62. This in turn causes the bellows 56 to contract and pull plate 48 away from the valve element 32. The force of spring 44 then decreases, thereby permitting a smaller pressure differential across the metering orifice 20 and a resultant smaller flow.

The net result then is that the flow set by the area of the metering orifice 20 is corrected by variations in fuel viscosity. Since the fuel energy level increases with increasing viscosity, the viscosity-sensing device 66 and the pressure-regulating device 26 are connected to correct flow in a decreasing direction for an increase in fuel viscosity. Therefore, fuel with a constant selected energy level is delivered to the engine 10 to maintain a given power output irrespective of fuel viscosity changes. It is apparent to those skilled in the art that the pressure-regulating device 26 and the viscosity-sensing device 66 may be adjusted to achieve this result. One way to adjust the device is to provide the sharp-edged orifice 86 with a variable area so that the relative flows from the control ports 78, 80 may be adjusted to give pressure outputs for a given level of fuel viscosity.

The viscosity sensor incorporated in the fuel control system illustrated above provides a highly simplified and effective means of compensating for fuel viscosity in that it receives its power directly from the fuel supply to be compensated and has a minimum of working parts. However, the viscosity sensor 66 is not limited to such a use but may be used in many control systems to sense the viscosity of a pressurized liquid.

I claim:

1. In a gas turbine engine having a power output proportional to the rate of flow of fuel supplied to the engine and including:
   means for pressurizing a source of fuel;
   means for providing a flow path from the fuel pressurizing means to said engine;
   a fuel metering orifice interposed in said flow path and having a variable area for varying the fuel flow rate to said engine and the power output thereof;
   means for maintaining a constant predetermined pressure differential across the orifice, whereby fuel flow through said fuel metering orifice is proportional to the area thereof;
   the improvement comprising:
   a fluidic device comprising a nozzle and a means for connecting said nozzle to said fuel flow path means whereby a power stream is discharged from said nozzle, receiver means positioned so that said power stream impinges on said receiver means, and a control jet means connected to said fuel flow path means and adapted to deflect said power stream responsive to flow through said control jet means, said control jet means including a means responsive to at least the viscosity parameter of said fuel for varying the flow through said control jet means; and
   means connected to said receiver means and responsive to the pressure output of said fluidic device for compensating said pressure differential means to vary the predetermined pressure differential across said orifice;
   whereby the power output of said engine is maintained at a level proportional to the area of said fuel metering orifice irrespective of the variation in said fuel parameter.

2. Apparatus as in claim 1 wherein the flow-varying means of said fluidic device comprises a laminar flow element through which said fuel is passed whereby fuel flow from said control jet means is proportional to the viscosity of said fuel.

3. Apparatus as in claim 1 wherein:
   the control jet means of said fluidic device comprises a pair of control jet discharge ports on opposite sides of said power stream and means for forming flow paths from said ports to said fuel flow path means so that the power jet is deflected as a function of the relative flow from said control jet discharge ports;
   said flow-varying means comprises a laminar flow element interposed in one of said control jet flow paths whereby the power stream is deflected in response to changes in viscosity of said fuel.

4. Apparatus as in claim 3 wherein said flow-varying means further comprises a sharp-edged orifice interposed in the other of said control jet flow paths.

5. Apparatus as in claim 4 wherein said sharp-edged orifice has an adjustable variable area whereby the power stream from said fluidic device may be set in an undeflected position for a given level of viscosity.

6. Apparatus as in claim 5 wherein said means for maintaining a constant predetermined pressure differential across said fuel metering orifice comprises:
   means for providing a bypass flow path from said fuel flow path means upstream of said fuel metering orifice to a low pressure discharge point;
   a valve element interposed in said flow path for varying the bypass flow as a function of the displacement of said valve element;
   means for applying the fuel flow path pressure upstream of said fuel metering orifice to one face of said valve element whereby the valve element is urged in a direction to increase bypass flow;
   means for applying the fuel flow path pressure downstream from said fuel metering orifice to the opposite face of said valve element;
   means for yieldably urging said opposite face of the valve element with a predetermined force whereby the valve element controls the bypass flow to maintain said predetermined pressure level across the fuel metering orifice;
   said compensating means comprises a means responsive to said received pressure for varying the predetermined force which said yieldable urging means exerts on said valve element.